United States Patent
Hejzlar

[11] 3,889,768
[45] June 17, 1975

[54] PLATFORM SCALE FOR WEIGHING A MASS INDEPENDENTLY OF THE RELATIVE POSITION OF THE MASS ON THE PLATFORM

[75] Inventor: Sid Hejzlar, Flushing, N.Y.
[73] Assignee: John Chatillon & Sons, Inc., Kew Gardens, N.Y.
[22] Filed: Oct. 19, 1973
[21] Appl. No.: 407,930

[52] U.S. Cl. ............... 177/229; 177/198; 177/253
[51] Int. Cl. ............................................ G01g 23/26
[58] Field of Search ............ 177/198, 225, 229–231, 177/246, 256, DIG. 9

[56] References Cited
UNITED STATES PATENTS

| | | | |
|---|---|---|---|
| 2,646,274 | 7/1953 | Weckerly | 177/229 X |
| 3,148,742 | 9/1964 | Giulie | 177/229 X |
| 3,160,219 | 12/1964 | Meier | 177/198 |
| 3,347,328 | 10/1967 | Schieser et al. | 177/229 |
| 3,443,653 | 5/1969 | Marshall | 177/229 X |
| 3,532,175 | 10/1970 | McFayden | 177/169 |
| 3,647,010 | 3/1972 | Beardmore et al. | 177/230 |
| 3,656,569 | 4/1972 | Johnson | 177/229 X |

Primary Examiner—Richard B. Wilkinson
Assistant Examiner—Vit W. Miska
Attorney, Agent, or Firm—Roland T. Bryan

[57] ABSTRACT

A platform scale for weighing a mass independently of the relative position of the mass on the platform including a supporting structure and a platform for carrying the mass during the weighing operation. Means comprising first and second generally horizontal pivoting check links are provided to mount the platform on the support structure for upward and downward reciprocal displacement when loaded with a mass. Means are also provided to exert a resistive force opposing downward displacement of the platform. The platform and resistive force means are arranged on opposite sides of the pivots connecting the platform to the check links to cause the resistive force and mass to produce additive moments about the pivots to thereby maintain the first check link in compression along its axis and the second check link in tension along its axis. This platform scale also includes means for relating the downward displacement of the platform to the weight of the mass.

6 Claims, 7 Drawing Figures

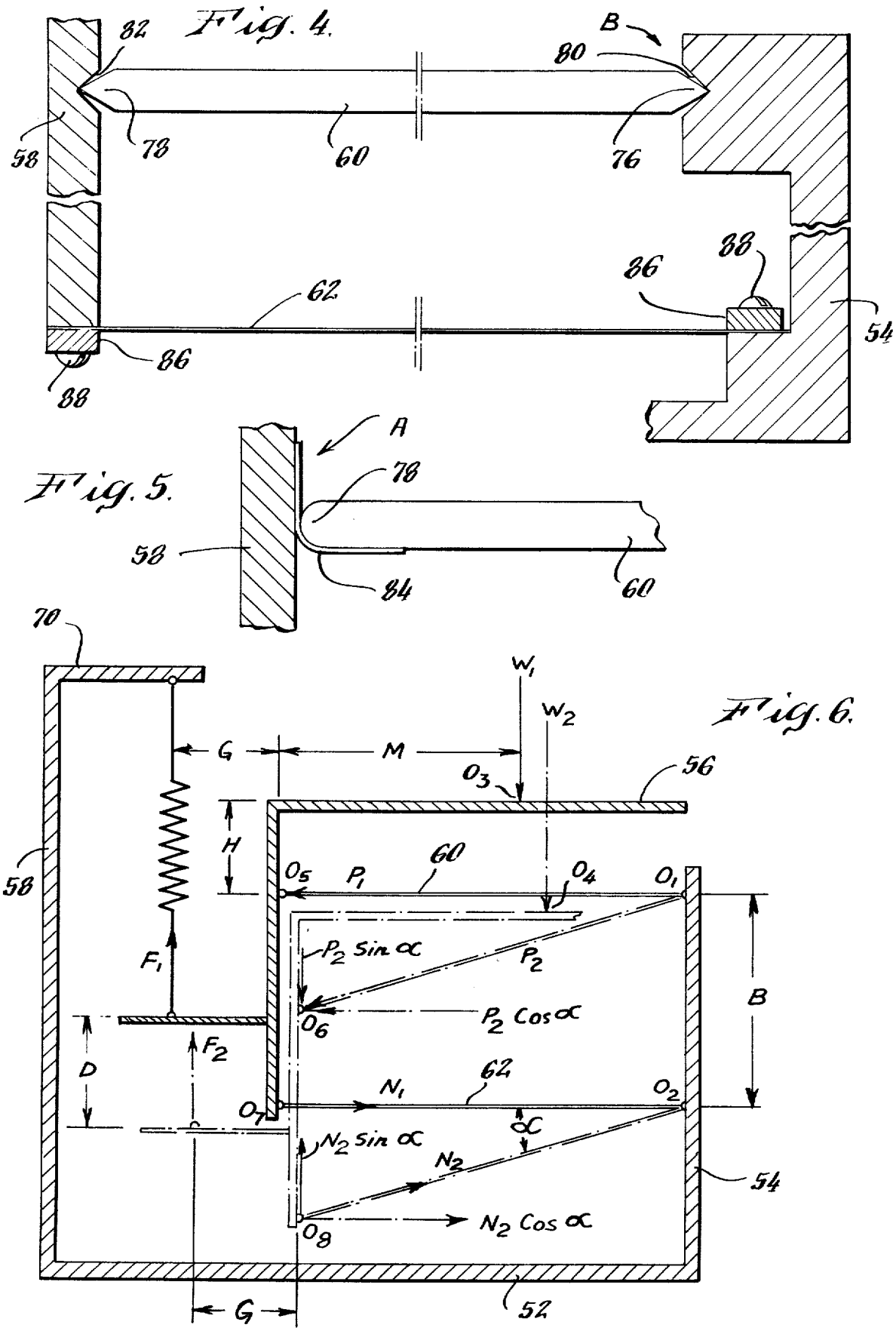

PLATFORM SCALE FOR WEIGHING A MASS INDEPENDENTLY OF THE RELATIVE POSITION OF THE MASS ON THE PLATFORM

BACKGROUND OF THE INVENTION

1. Field of the Invention

This invention relates to a platform scale which weighs a mass independently of the relative position of the mass on the platform. Platform scales are presently used in a wide variety of applications. For example, such scales are indispensable to scientific laboratories where materials are weighed in conjunction with experimentation. Such scales may also be used in marketing areas where the price of a certain article is determined by that article's weight. Larger platform scales may be used in heavy industry.

The platform scale of the present invention may advantageously be used to perform these and other weighing functions.

2. Description of the Prior Art

Platform scales of various constructions are in use at the present time. One such construction employs a platform, for carrying the mass to be weighed, which rests at three or more points or loadcells on a lever system. The loads exerted at each loadcell on the lever system are summed to determine the total load.

A second known construction employs a platform which rests at one or two points or loadcells on a lever system. The platform is further supported by two or more generally horizontal check links which constrain the platform to be displaced upwardly and downwardly through an arcuate path while maintaining the platform in a horizontal attitude.

In order to better understand the present invention, it is helpful to initially describe this prior art platform scale which employs a conventional check link system to constrain the platform to move up and down through an arcuate path, while maintaining the horizontal attitude of the platform. Such a scale and check link system are illustrated in FIGS. 1, 2A, and 2B and include a supporting structure 10, having at least one upwardly projecting leg 12, and a platform 14, generally T-shaped in front elevation, having a downwardly projecting leg 15. A check link system comprising an upper check link 16 and a lower check 18 is provided to reciprocally mount the T-shaped platform on the support structure 10. The T-shaped platform 14 rests at one point 19 on a lever system which includes a lever 20 that pivots about a fulcrum 22 mounted in the support structure 10. Means in the form of a spring 24, coupled to the movable lever 20 at one end and to the support structure at the other end, are provided to exert an upward force to thereby balance the downward force exerted by the weight of the T-shaped platform 14 and any mass loaded on the platform.

If the T-shaped platform 14 is symmetrically formed and constructed of a homogenious material, the platform 14 may be loaded at some point $P_1$ whereby the center of mass of the platform and the test mass is positioned to the left of the point 19 as shown in FIG. 1. Loading at this position $P_1$ urges the platform 14 to rotate counterclockwise about the point 19. Therefore, the upper check link 16 is placed in tension along its axis and the lower check link 18 is placed in compression along its axis.

Similarly, if the platform 14 conforms to the conditions noted above, it may be loaded at some other point $P_2$ whereby the center of mass of the platform and the test mass is positioned to the right of the point 19 as illustrated in FIG. 1. In this case, the platform 14 is urged to rotate clockwise about the point. Then the upper check link 16 is placed in compression along its axis and the lower check link 18 is placed in tension along its axis.

One conventional means for mounting the check links 16 and 18 is shown in FIGS. 2A and 2B and comprises pivot pins 26 anchored to the support structure leg 12 and the platform leg 15. The check links, 16 and 18, are provided with appropriate clearance holes 28, which accommodate the pivot pins 26.

When the test mass is loaded at point $P_1$, the disposition shown in FIG. 2A arises, i.e. the upper check link 16 is placed in tension along its axis and the lower check link 18 is placed in compression along its axis. Therefore, the upper link 16 has an active length or provides an effective radius of rotation equal to dimension A. Similarly, the lower check link 18 has an active length or provides an effective radius of rotation equal to dimension B. However, when the test mass is loaded at point $P_2$, the opposite disposition shown in FIG. 2B arises and the active length of each link changes. Thus the active length of the upper link becomes A' and the active length of the lower link becomes B'.

This change in active length of the check links depending upon where the mass is loaded on the platform introduces a variation in the indicated measured weight. In the case shown in FIG. 2A, the point at which the upper check link 16 is coupled to the platform leg 15 rotates at a larger radius relative to the support structure leg than does the point at which the lower check link 18 is coupled to the platform leg. The effect of this radius difference is to cause the point 19 to tend to move rightward relative to the lever 20 as shown in FIG. 1 when the platform is displaced downward.

In contrast, in the case shown in 2B, the point at which the upper check link 16 is coupled at the platform leg 15 rotates at a smaller radius relative to the support structure than does the point at which the lower check link 18 is coupled to the platform leg 15. The effect of this radius difference, opposite to that discussed above, is to cause the point 19 to tend to move leftward relative to the lever 20 as shown in FIG. 1 when the platform 14 is displaced downward.

Since the load point tends to move leftward or rightward relative to the lever 20 depending on the position of the test mass on the T-shaped platform 14, the effective moment arm of the lever 20 about the fulcrum 22 changes. Hence, the torque exerted about the fulcrum 22 by the loaded platform changes and the scale displacement is not linearly related to the weight of the test mass in a constant manner.

In sum, a variation of indicated weight results because of the relative disposition of the check links depending upon position of the mass on the platform. At some mass positions, a given check link may be in compression along its axis; at others that check link may be in tension. Thus, the active length of that check link varies. Therefore, this prior scale is subject to error since the measured weight may differ for a given mass if that mass is not always placed in the same relative position on the platform. This scale does not provide linear weight measurement independent of mass position on the platform.

The platform scale of the present invention is intended to remedy the above-noted difficulties characteristic of prior apparatus. In particular, this platform scale is designed to measure the weight of a mass independently of the position of the mass on the platform.

SUMMARY OF THE INVENTION

Discovery of the problem associated with certain prior art platform scales, i.e. failure to provide linear weight measurement independent of mass position on the platform, and its cause lead to the present invention. Thus, this platform scale of the present invention, a preferred embodiment of which is described below in detail, includes a support structure, having an upwardly projecting leg, and a generally horizontal platform, also having a leg which projects downward from one edge of the platform. Means in the form of upper and lower generally horizontal pivoting check links are provided to relatively reciprocally mount the platform on the support structure. Both the upper and lower check links are mounted in generally mutually parallel relation with their axes extending between the downwardly projecting platform leg and the upwardly projecting support structure leg. Means in the form of a spring are provided to exert a resistive force opposing downward displacement of the platform.

The platform and the spring are arranged on opposite sides of the pivots connecting the platform to the check links in order to cause the resistive force and mass to produce additive moments about the pivots. This arrangement maintains the upper check link in compression along its axis and the lower check link in tension along its axis.

This platform scale, then, employs a system of check links wherein the active length of each check link is constant. Therefore, the indicated measured weight does not depend upon the relative position of the mass on the platform and the weight indicated is linearly related to the downward displacement of the platform. This aspect of the invention will be more fully explained below.

Accordingly, it is an object of the present invention to provide a unique and novel platform scale which measures the weight of the mass independently of the relative position of the mass on the platform.

Other objects, aspects, and advantages of the present invention will be pointed out in, or will be understood from the following detailed description, when considered with the accompanying drawings.

BRIEF DESCRIPTION OF THE DRAWINGS

FIG. 4 is an enlarged diagrammatical view of the check link system of this platform scale showing the upper check link in compression along its axis and the lower check link in tension along its axis.

FIG. 5 is an enlarged view of a device for mounting the upper check link.

FIG. 6 is a schematic representation of the components of the platform scale of the present invention showing the mathematical relationship between these components. Proof that the weight indicated by this scale is independent of the relative position of the mass on the platform may be made with reference to this Figure.

Corresponding reference numerals indicate corresponding structural elements and characteristic features in each of the respective drawings.

DESCRIPTION OF THE PREFERRED EMBODIMENT

Figure 1:
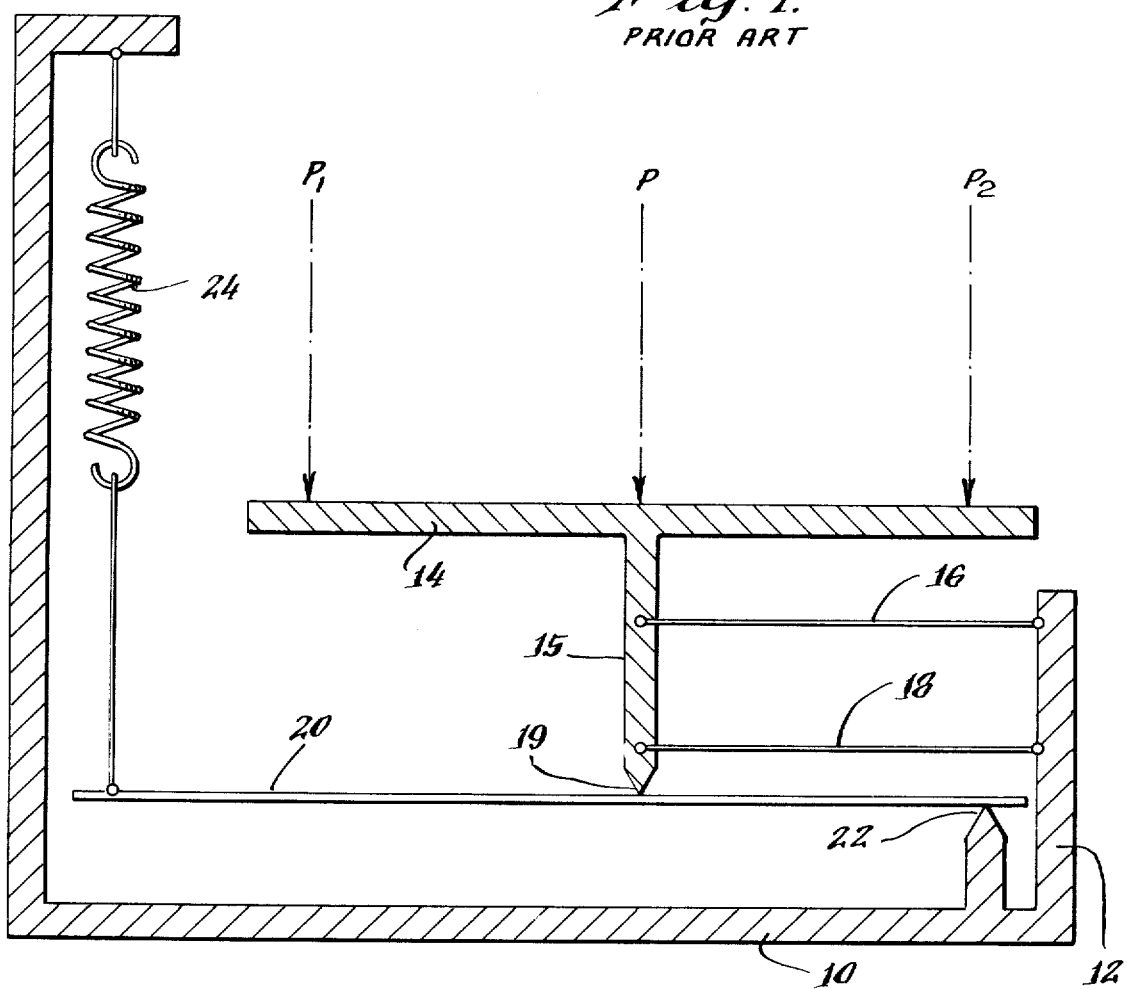
FIG. 1 is a diagrammatical view of a prior art platform scale that utilizes a platform which rests at one point on a lever system. As described above, a check link system is employed to constrain the platform to move upward and downward through an arcuate path while maintaining the horizontal attitude of the platform.
Figure 2A:
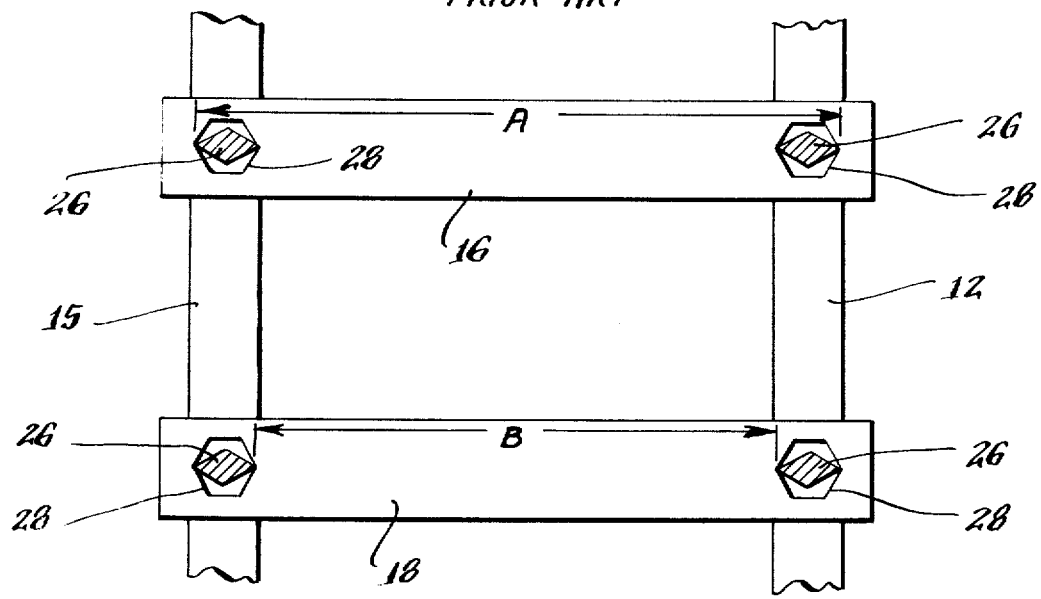
FIG. 2A is an enlarged diagrammatical view of a typical check link system used in the platform scale illustrated in FIG. 1. This system is shown as it would appear if the platform was loaded at point $P_1$ in FIG. 1.
Figure 2B:
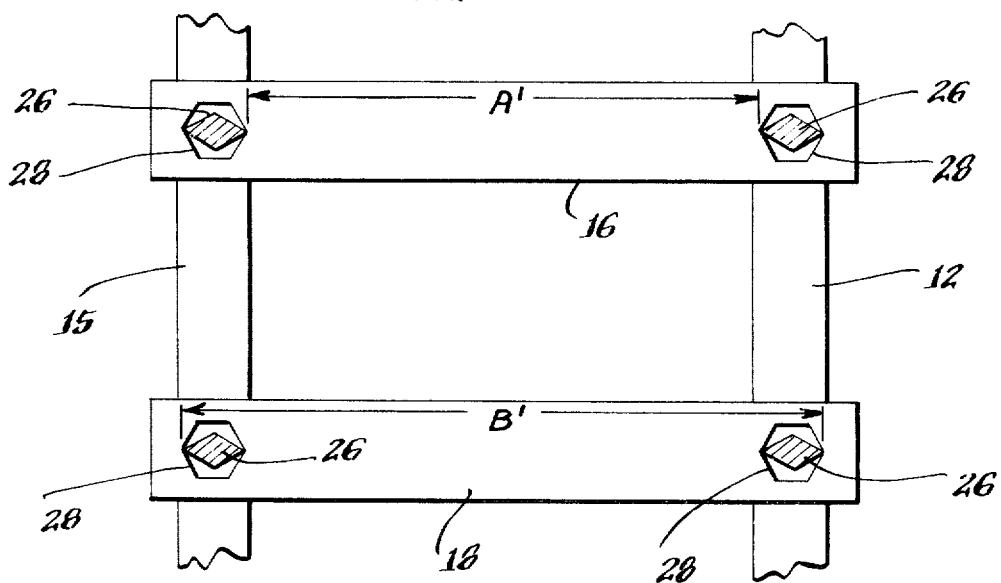
FIG. 2B is a second enlarged diagrammatical view of the check link system illustrated in FIG. 2A shown as it would appear if the platform was loaded at point $P_2$.
Figure 3:
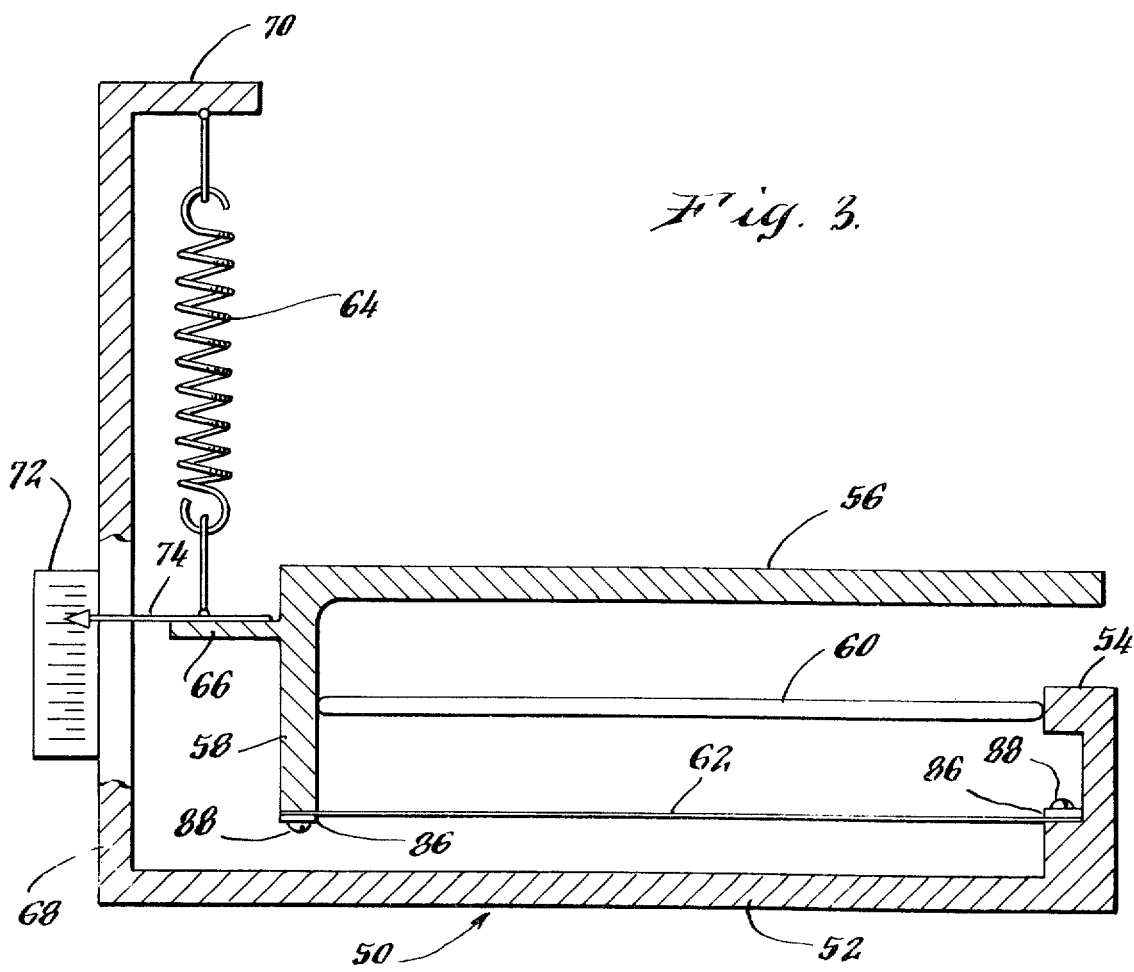
FIG. 3 is a diagrammatical view of the platform scale of the present invention.

Referring now to FIG. 3, the platform scale 50, constructed in accordance with the preferred embodiment of the present invention, is shown in its unloaded condition ready to weigh a test mass. This platform scale 50 includes a supporting structure 52, having one upwardly projecting leg 54. The scale 50 further includes a generally horizontally disposed platform 56, for carrying a test mass during the weighing operation, having a downwardly projecting leg 58 integrally formed with the platform at the platform's edge. This platform-platform leg arrangement appears L-shaped in front elevation. The platform leg may be integrally formed with the platform as shown or may be welded, riveted or rigidly attached thereto in any other suitable manner.

A check link system in the form of upper and lower check links, 60 and 62 respectively, is provided to relatively reciprocally mount the platform 56 and platform leg 58 on the support structure 52. The check links, 60 and 62, are mounted so that their respective axes extend from the platform leg 58 to the support structure leg 54 and are mutually parallel with respect to each other. It may be beneficial to include more than a single upper and lower check link in this system. For example, tandem upper and lower check links, mounted side-by-side in spaced relation may be utilized to provide added platform stability. However, it is believed that two check links arranged as shown and described are satisfactory.

The platform scale of the present invention further includes means in the form of a spring 64 for exerting an upward resistive force to balance the downward force exerted by the weight of the platform, platform leg, and test mass. The platform 56 is provided with a spring connection tab 66 and the support structure is provided with a second upwardly projecting leg 68 having a spring connection hook 70. The spring is thus coupled to the support structure and the platform at the connection hook 70 and the connection tab 66 respectively. A scale 72 is mounted on the support structure 52 and cooperates with a pointer 74 mounted on the platform to measure the downward displacement of the platform 56 when loaded with a test mass. This scale is calibrated to relate the downward displacement of the platform directly to the weight of the test mass.

The platform and the spring are arranged on opposite sides of the pivots or pivot points at which the check links 60 and 62 are connected to the platform leg. Thus the spring 64 and the platform 56 and a test mass produce additive moments about these pivot points to maintain the check links at constant length, to maintain the upper check link in compression, and to maintain the lower check link in tension.

The enlarged view of the link system shown in FIG. 4 illustrates one manner in which the upper and lower check links may be pivotally mounted. The upper check link 60 may be a round, square, or rectangular member having beveled pivot points 76 and 78 at both ends. These points are accepted by corresponding notches 80 and 82 disposed in the support structure leg 54 and the platform leg 58 respectively. This check link 60 is held between the two notches in compression as previously described. The point-notch joints provide antifriction pivot means for this check link. The angles at which the check link points and the notches are cut is determined by the maximum downward displacement which it is desired for the platform to achieve.

Another mounting system or antifriction pivot means suitable for both ends of the upper check link 60 interacting with the platform leg 58 and the support structure leg 54 is shown in FIG. 5. There the check link is shown having a rounded end 78 which is cradled in a flexure strip 84. This flexure strip prevents the check link 60 from falling yet permits the check link to rotate around the coupling point.

The lower check link 62 is shown in FIG. 4 as a thin flexure member. It should be wide enough to provide sufficient strength to withstand the maximum tensile force which might be exerted by the weight of test mass, the platform and the platform leg. However, it should be thin enough so as not to significantly inhibit the upward and downward displacement of the platform. The lower check link 62 should be clamped to both the support structure leg 54 and the platform leg 58. This may be accomplished, for example, with clamp plates 86 held in place by screws 88.

It has been found that the relative positions of the platform 56, the platform leg 58, and the check link system are such that the center of mass of the platform, platform leg and any test mass is always disposed to maintain the upper check link 60 in compression and the lower check link 62 in tension along their respective axes. This results from the platform-spring arrangement whereby the spring force and the weight of the test mass and platform always produce additive moments.

The benefit of this arangement may be illustrated by reference to FIG. 6. There the platform scale of the present invention is shown schematically. The solid lines represent the platform, at rest, when displaced by a test mass having weight $W_1$; the dotted lines represent the platform, at rest, when displaced by a test mass having weight $W_2$ placed at the same relative position on the platform. In each case, the system is in equilibrium and the sum of the torques about any given point must equal zero. Thus, where:

$T(O_3)$ = sum of the torques about point $O_3$
$T(O_5)$ = sum of the torques about point $O_5$
$T(O_6)$ = sum of the torques about point $O_6$
$T(O_7)$ = sum of the torques about point $O_7$
$T(O_8)$ = sum of the torques about point $O_8$ $M$ = moment arm of the mass about points $O_5$ and $O_7$ $G$ = moment arm of the resistive spring force about points $O_5$ and $O_7$
$B$ = distance between the check link pivot points
$H$ = distance between the upper check link pivot point and the platform
$F_1$ = resistive force exerted by the spring when the platform is in equilibrium carrying mass $W_1$
$F_2$ = resistive force exerted by the spring when the platform is in equilibrium carrying mass $W_2$
$N_1$ = tension force exerted by the lower check link when the platform is in equilibrium carrying mass $W_1$
$N_2$ = tension force exerted by the lower check link when the platform is in equilibrium carrying mass $W_2$
$P_1$ = compression force exerted by the upper check link when the platform is in equilibrium carrying mass $W_1$
$P_2$ = compression force exerted by the upper check link when the platform is in equilibrium carrying mass $W_2$
$\alpha$ = angle through which the lower check link is displaced by mass $W_2$ Given these parameters, it can be shown that:

$$\Sigma T(O_5) = W_1 M + F_1 G - N_1 B = 0 \quad (1)$$
$$\Sigma T(O_7) = W_1 M + F_1 G - P_1 B = 0 \quad (2)$$
$$\Sigma T(O_6) = W_2 M + F_2 G - N_2 \cos\alpha B = 0 \quad (3)$$
$$\Sigma T(O_8) = W_2 M + F_2 G - P_2 \cos\alpha B = 0 \quad (4)$$

From equations (1) and (2), it can be shown that:
$$N_1 = P_1 \quad (5)$$

Similarly, from equations (3) and (4), it can be shown that:
$$N_2 = P_2 \quad (6)$$

Continuing to apply the fact that the sum of the torques at any given point must equal zero when the system is in equilibrium requires:

$$\Sigma T(O_3) = P_1 H + F_1(G + M) - N_1(H + B) = 0$$
$$= P_1 H + F_1 M - N_1 H - N_1 B = 0 \quad (7)$$

Substituting equation (5) into equation (7) yields:
$$F_1 G + F_1 M = N_1 B \quad (8)$$

Substituting equation (1) into equation (8) yields:
$$F_1 G + F_1 M = W_1 M + F_1 G \quad (9)$$

Or:
$$F_1 = W_1 \quad (10)$$

Similarly:
$$\Sigma T(O_4) = P_2 \cos\alpha H + F_2(G + M) - N_2 \cos\alpha(H + B) = 0$$
$$= P_2 \cos\alpha H + F_2 G + F_2 M - H N_2 \cos\alpha - B N_2 \cos\alpha = 0 \quad (11)$$

Substituting equation (6) into equation (11) yields:
$$F_2 G + F_2 M = N_2 \cos\alpha B \quad (12)$$

Substituting equation (3) into equation (12) yields:
$$F_2 G + F_2 M = W_2 M + F_2 G \quad (13)$$

Or:
$$F_2 = W_2 \quad (14)$$

Therefore, the downward force exerted by the weight on the platform exactly equals the upward force exerted by the spring completely independently of the quantity M indicative of the relative position of the mass on the platform. Furthermore, the downward displacement of the platform is linearly related to the weight of the mass. Thus, by measuring the deflection of the spring D having a known force constant or the downward displacement of the platform, the load W can be accurately measured independently of the test mass position on the platform.

Although a specific embodiment of the present invention has been disclosed in detail above, it is to be understood that this is only for purposes of illustration. This disclosure of a platform scale for weighing a mass independently of the position of the mass on the platform should not be construed as limiting the scope of the invention, since modifications may be made to the described structure by those skilled in the art in order to adapt this platform scale to particular applications.

I claim:

1. A weighing scale of the type which has a support member for supporting objects while they are being weighed which is rigidly affixed to an associated leg member which extends downward from said support member in a vertical dimension, and check links which are pivotally associated with both said leg member and an associated support structure and are substantially parallel axially to each other and in lateral direction with respect to said leg member, are all in substantially the same directional orientation with respect to said leg member whereby said support member may move downward against a resistive force means while said vertical dimension of said leg member is substantially uniformly retained in its vertical orientation, characterized by the facts that said support member is affixed at one of its ends to said leg member, and that said support member effectively is in substantially the same orientation with respect to said leg member as are said check links.

2. A platform scale for weighing a test mass independently of the relative position of the test mass on the platform, said platform scale comprising:

a supporting structure having an upwardly projecting leg, a generally horizontal platform, for carrying the test mass during the weighing operation, having a leg rigidly mounted on and projecting downwardly from one edge of said platform;

means for relatively reciprocally mounting said platform on said structure for downward displacement when loaded, said means including at least one upper check link, having opposing pivot ends, mounted between said upwardly projecting support structure leg and said downwardly projecting platform leg, and at least one lower check link, also having opposing pivot ends, mounted between said upwardly projecting support structure leg and said downwardly projecting platform leg in generally mutually parallel relation to said upper check link, means exerting a resistive force opposing displacement of said platform when loaded with the test mass, the platform being structurally integrated at one of its ends with the vertically extending leg thereof and extending from said leg in substantially the same direction with respect thereto as do said check link means and the resistive force means being arranged opposite the side of said platform leg as that from which the upper and lower check links coupled to the platform leg extend to cause the resistive force and the platform and test mass to always produce additive moments about these pivots to thereby place the check links in unchanged states of tension and compression whenever the test mass is supported on the platform to maintain the check links in constant length; and means for relating the resulting displacement of the platform when loaded with the test mass to the weight of the test mass to provide linear weight measurement independently of test mass position on the platform.

3. A platform scale for weighing a test mass independently of the relative position of the test mass on the platform, said platform scale comprising:

a support structure having a generally vertically extending leg;

a horizontally disposed platform, for carrying the test mass during the weighing operation, also having a generally vertically extending leg;

means for relatively reciprocally mounting said platform on said support structure for displacement when loaded with the test mass, said means including first and second pivoting check link means each comprising at least one check link having opposing pivot ends, each of said check links being coupled to said support structure and platform legs, with the check link axis extending there between, at said opposing pivot ends, said check link axes being in generally mutually parallel relation, one above the other;

means exerting a resistive force opposing displacement of said platform when loaded with the test mass, the platform being structurally integrated at one of its ends with the vertically extending leg thereof and extending from said leg in substantially the same direction with respect thereto as do said check link means and the resistive force means being arranged opposite the side of said platform leg as that from which the check links coupled to the platform leg extend to cause the resistive force and the platform and test mass to always produce additive moments about these pivot ends to thereby place the check links in unchanged states of tension and compression whenever the test mass is supported on the platform to maintain the check links in constant length; and means for relating the resulting displacement of the platform to the weight of the test mass to provide linear weight measurement independent of test mass position on the platform.

4. The platform scale for weighing a test mass independently of the relative position of the test mass on the platform as claimed in claim 3 wherein:

said second check link means is at least one flexure member, maintained in tension along its axis, having first and second ends tightly clamped to said platform leg and said support structure leg respectively.

5. The platform scale for weighing a test mass independently of the relative position of the test mass on the platform as claimed in claim 3 wherein:

antifriction pivot means are disposed to cooperate with said first check link means, maintained in compression along its axis, each check link in said first check link means having first and second ends interacting with said support structure and platform legs respectively, said antifriction pivot means being positioned at the points of check link-leg interaction.

6. The platform scale for weighing a test mass independently of the relative position of the test mass on the platform as claimed in claim 5 wherein said antifriction pivot means include:

a flexure strip for cradling each end of each of said first check links in said first check link means, permitting the opposite end of each said check links to move upward and downward relative to said cradled end.

* * * * *

UNITED STATES PATENT OFFICE
CERTIFICATE OF CORRECTION

Patent No. 3,889,768   Dated June 17, 1975

Inventor(s) Sid Hejzlar

It is certified that error appears in the above-identified patent and that said Letters Patent are hereby corrected as shown below:

Column 6, line 41, delete the equal sign (=), first occurrence, and correct the formula to read as follows:

-- $P_1H + F_1G + F_1M - N_1H - N_1B = 0$ --

Signed and Sealed this eleventh Day of November 1975

[SEAL]

Attest:

RUTH C. MASON
Attesting Officer

C. MARSHALL DANN
Commissioner of Patents and Trademarks